ABSTRACT OF THE DISCLOSURE

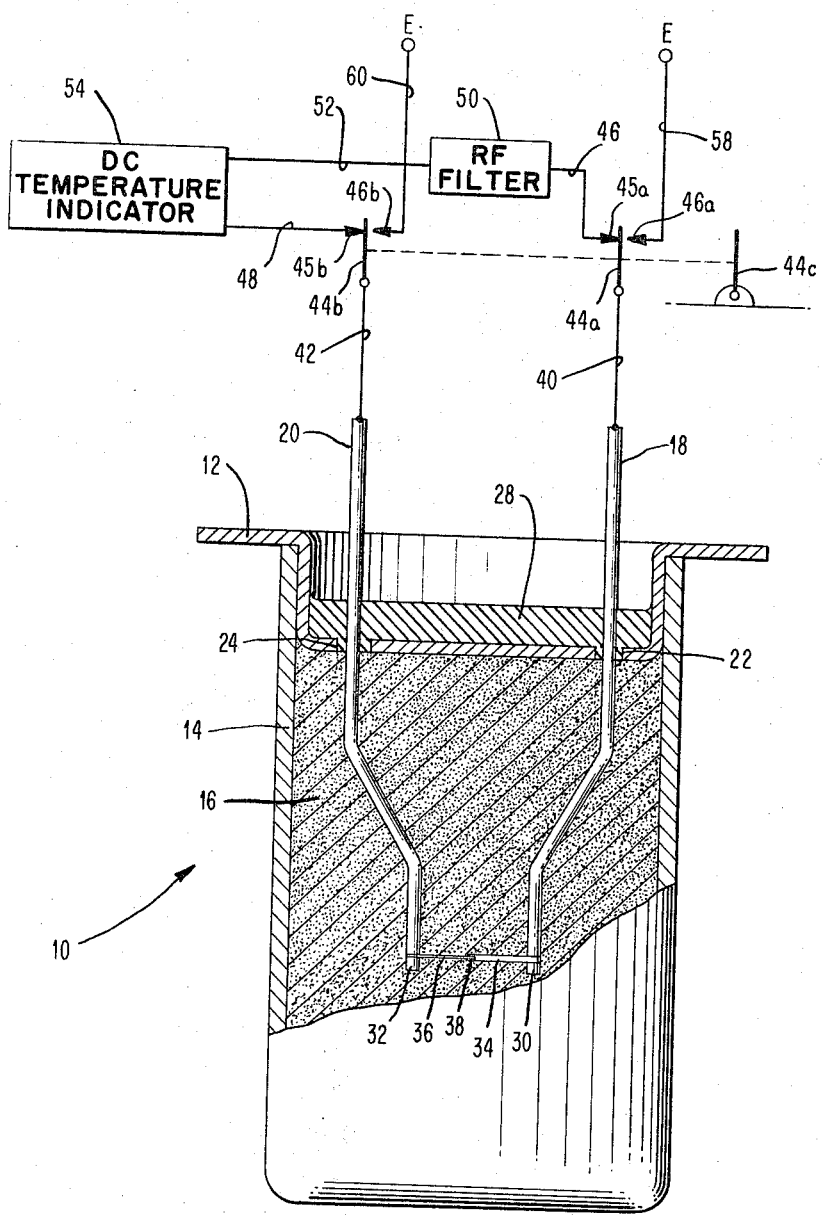

A detonatable squib with a bridging circuit consisting of a thermocouple of fine wires such as Chromel and Alumel. The cross section of the wires is such that they have equal conductivity. An R.F. filter in series with a D.C. temperature indicator are normally connected to the squib to monitor the temperature rise due to stray radiation so that premature detonation may be avoided. When detonation is required, the squib is switched to a current source sufficient to heat the bridging circuit to the point where the surrounding explosive is set off.

---

This invention relates to the construction of squibs and more particularly to electrically operated squibs which provide means for measuring in situ the effects of incident electromagnetic radiation while at the same time providing for either a switching function or an explosive initiating function as with the usual squib.

In the past, the normal construction for electrically initiated squibs has included a fine tungsten bridgewire providing a detonatable connection between two relatively large conductors. Such squibs can be used to switch electrical circuits, for by introducing energy into the circuit the tungsten wire can selectively be destroyed or detonated so as to break the electrical circuit between the conductors connected by the tungsten wire. The destruction of the tungsten wires of course is accompanied by a release of heat and a flash. The detonation therefore can be utilized to initiate an explosion when the bridgewire is located in an explosive mixture.

In certain applications, squibs are exposed to incident electromagnetic radiations, in the R.F. region, for example. In such situations, the R.F. radiation acts to heat the tungsten wire of the usual squib and it is important that this heat should not be sufficient to cause premature detonation. To avoid premature detonation, squibs have in the past utilized vacuum proximity thermocouples in conjunction with the tungsten bridgewire for the purpose of monitoring the temperature or temperature rise in the squibs and particularly of the tungsten wire. This type of construction tends to be more expensive and more complicated in construction than is desirable and the accuracy and sensitivity with which the temperature of the tungsten wire can be measured is not always sufficient.

The present invention, therefore, has for an object the provision of an improved squib construction.

It is a further object of this invention to provide a squib which is simple in construction and also capable of providing for a monitoring of the effects of incident radiation on the squib without undue complication in the constructon of the squib.

A still further object of this invention is the provision of an electro-explosive squib whose response to incident radiation can be readily and accurately monitored with increased sensitivity.

Another object of this invention is the provision of an improved electrically operated squib system having means for detonating the squib as well as well as means for monitoring the effects of incident R.F. radiation on the squib so that premature detonation from the ambient R.F. field may be prevented.

In carrying out this invention there is provided an electrical squib whose bridging circuit comprises two dissimilar metals joined to form a thermocouple junction so that the bridging circuit can be utilized to monitor the temperature of the thermocouple junction or the temperature rise of that junction until such time as it is desirable to detonate the squib. When detonation is desired, a pluse of electrical energy is sent through the bridge circuit to detonate that circuit and thereby provide the switching function or the initiation of an explosion, as may be desired.

A more complete understanding of the present invention may be had by reference to the following description in conjunction with the figure which is a drawing showing a cross-section of one form of squib and the associated electrical circuits which make up the system for using the squib.

In the figure, the squib 10 is shown as having a base portion 12 which may for example be a drawn cylindrical metal base such as those used in the construction of transistors. The base 12 is shown sealed to a cover portion 14 to form the squib casing. Cover 14 is shown in the figure as being a cylindrical cover which fits over the drawn portion of the base 12 and is sealed thereto sufficiently to enclose and retain an explosive mixture 16.

Two spaced pins 18 and 20 are introduced through the base portion 12 into the interior of the squib casing through apertures 22 and 24 in base 12. The pins 18 and 20 may be constructed, for example, of gold plated Kovar (a cobalt-nickel alloy) and the point at which these pins enter the interior of the squib casing may be sealed, as by a ceramic material 28. While the pins 18 and 20 will normally be in the form of wire and have a cylindrical shape, they may of course be of any desired shape.

In the figure, the pins 18 and 20 are shown positioned so that the ends interior to the squib casing, namely ends 30 and 32, are spaced apart by a small distance, for example a distance of 1/16" may be desirable.

The ends 30 and 32 are shown in the figure as being connected by a bridging circuit which includes two wires of dissimilar metals, namely wires 34 and 36, which form a series circuit between the pins 30 and 32 since they are connected end-to-end with the junction between them, junction 38, forming a thermocouple junction. This junction may be formed by a lap or a butt weld. The wires 34 and 36 may also be lap welded to the ends 30 and 32 of pins 18 and 20, respectively.

One type of bridging circuit could be in the form of a bridgewire made from Chromel and Alumel wires. For example, wire 34 may be of Chromel metal while wire 36 may be of Alumel metal. While it is not necessary that the conductivity of the bridge wire be the same throughout its entire length, it is more advantageous from an operating standpoint if the conductivity is the same throughout the length of the bridgewire. Thus the lower conductivity Chromel wire 34 is shown in the figure as having a larger cross section than the higher conductivity Alumel wire 36, the relationship between the cross sections being such that the conductivity throughout the bridge wire length is constant.

The wires 34 and 36 may be of the normal cylindrical shape or they may be in the form of ribbons of rectangular cross section. One combination which has been found useful consists of a ribbon of Chromel P having the dimensions .001" x .003" and Alumel ribbon having the dimensions, .0005" x .0018". The wire or ribbon is necessarily of a small cross section so that detonation of the bridge wire may be carried out without the need for providing an excessive amount of electrical energy.

If the squib of the figure is to be used for a switching function, the casing of the squib need not contain any material. However, as shown in the figure, when the squib is to be used for the initiation of an explosion, an explosive mixture 16 is packed in the interior of the squib casing and would normally be in intimate contact with the bridgewire 34, 36. It is therefore necessary that the material from which the sections of the bridgewire are made to be compatible with the explosive mixture 16. Chromel and Alumel are suggested as an example of one combination of materials which provide compatibility with the normal explosive mixtures used in squibs and which at the same time provide not only the necessary electrical characteristics to provide detonation upon the application of substantial electrical energy therethrough, but also the desirable characteristics for providing a good thermocouple. It will be evident to those skilled in the art that other combinations of dissimilar metals may be used for the wires 34 and 36 depending upon the particular explosive mixture which is used and depending upon the thermoelectric characteristics of the metals themselves and hence their usefulness as thermocouples.

Since the present invention replaces the normal tungsten bridgewire with a series connection of two dissimilar wires to form in one structure a thermocouple junction 38 as well as a detonating bridge wire 34, 36; the external circuitry connected to pins 18 and 20 must be used not only for the monitoring of the temperature of the thermocouple junction 38 but also for the selective application of the detonating signal. Therefore, pins 18 and 20 are respectively connected to electrical conductors 40 and 42 which connect the pins 18 and 20 to the movable switch contacts 44a and 44b of switch 44.

With the movable switch contacts 44a and 44b in the position shown in the figure, the conductors 40 and 42 are connected to conductors 46 and 48 respectively. The conductors 46 and 48 form a part of the temperature measuring circuit which is utilized to monitor the temperature of thermocouple junction 38. The conductor 46 leads to R.F. filter 50 which serves to filter out the R.F. currents induced into the circuit by the incident R.F. radiation. The R.F. filter is connected by way of conductor 52 to one of the inputs of a D.C. temperature indicator 54, the other input being from conductor 48.

The D.C. temperature indicator 54 may be any one of a number of well-known direct current temperature measuring devices for use in the measurement of temperature by measuring the electrical potential generated by thermocouples made up of wires 34 and 36.

When it is desirable to detonate the squib 10, the switch 44 is actuated by movement of its pivoted handle 44c to the right. This movement of handle 44c causes the movable contacts 44a and 44b to be moved out of contact with the left hand stationary contacts 45a and 45b into contact with the right hand stationary contacts 46a and 46b to connect them by way of conductors 58 and 60 to a source of electrical potential E which is desirably of sufficient magnitude to provide current through the bridgewire 34, 36 sufficient to detonate that wire and initiate an explosion of the mixture 16.

The squib described above with the pins 18 and 20 made of Kovar would be useful for monitoring the temperature rise of the thermocouple junction 38 due to incident R.F. radiation since the small mass of the wires 34 and 36 and their junction 38 would tend to heat up much more rapidly than the larger mass of the pins 18 and 20. Thus, pins 18 and 20 tend to act as heat sinks at the ends of the wires 34 and 36 so that the ends of wires 34 and 36 are cooled with respect to the junction 38.

In certain applications, it may be desirable to make a temperature measurement at junction 38 rather than a measurement of the temperature rise of the junction 38. In such applications, the pins 18 and 20 would then be desirably constructed of Chromel and Alumel wire respectively. The pins 18 and 20 would be introduced into the interior of the squib casing by any of a number of compatible sealing means well known to those skilled in the art. With such an arrangement, the junctions between the pin 18 and the conductor 40 and the pin 20 and conductor 42 would form the reference junctions of the thermocouple. Since these reference junctions would be at an ambient temperature, the temperature measurements would be referenced to that value. Alternatively, the wires 40, 42, 46 and 48 could be of appropriate Chromel and Alumel metal if it is desirable to bring the reference junction close to indicator 54.

It will be evident to those skilled in the art that bridging circuits capable of being used for the monitoring of their own temperature as well as for selective detonation can be constructed in forms other than those shown in the figure wherein the bridging circuits is formed by wires or strips 34 and 36. The present invention is therefore not limited to the specific structure shown in the figure but may take many other forms.

What is claimed is:

1. An electrically detonatable squib having a single bridging circuit comprising two dissimilar electrically conductive metals of small cross section joined to form a thermocouple junction.

2. An electrically detonatable squib as set forth in claim 1 in which the dissimilar electrically conductive metals of said bridging circuits are in the form of wires joined in series connection to form said thermocouple junction.

3. An electrically detonatable squib as set forth in claim 1 in which said dissimilar electrically conductive metals are Chromel and Alumel.

4. An electrically detonatable squib as set forth in claim 1 in which the dissimilar electrically conductive metals are each of cross section such that both have the same electrical conductivity.

5. An electrically detonatable squib comprising
   a plurality of supporting pins, and
   a bridgewire supported in electrical circuit connection between said pins, said bridgewire being formed by an end-to-end connection of dissimilar electrically conductive metals of small cross section such that there is formed between said pins a detonatable thermocouple.

6. An electro-explosive squib comprising
   a casing containing explosive material, and
   an explosion initiating element in said casing said initiating eelment including an electrical circuit having at least two sections of dissimilar electrically conductive metals whose thermoelectric characteristics are such that heating of the junction between said metals produces an E.M.F. indicative of the temperature change of said junction.

7. An electro-explosive squib comprising
   a casing containing an explosive and having one portion thereof forming a base,
   two spaced electrically conductive pins inserted through said base and terminating within said casing, and
   a bridge circuit electrically joining said pins, said bridge circuit being formed by a fine wire thermocouple to provide for monitoring the temperature changes at a junction of said thermocouple and to provide for detonation by the selective application of an electrical signal to said pins for initiating an explosion by heating said fine wire thermocouple from the current flow therethrough.

8. An electro-explosive squib assembly comprising
   a casing for receiving spaced electrically conductive pins to the interior of said casing from the exterior and adapted to contain an explosive mixture,
   an electrical circuit between said pins internal to said casing including two dissimilar materials connected to provide a thermocouple between said pins,
   a temperature measuring circuit connected to the external portion of said pins, said measuring circuit including an R.F. filter and a D.C. temperature indicator, and an explosion initiating circuit for selectively sending electrical energy to said electrical circuit between said pins sufficient to heat said circuit and thereby explode said mixture.

9. An electrically operated squib for performing a switching function comprising a thermocouple of fine wire providing an electrical circuit path, means connected to said thermocouple for measuring the temperature in the squib, and means for selectively sending sufficient electrical energy through said thermocouple and destroy said thermocouple to thereby disconnect said circuit path.

10. An electrically operated squib comprising a casing, two conductive pins inserted through said casing and terminating with their ends spaced apart within said casing, and a fine wire thermocouple of electrically conductive metals joining said spaced apart ends within said casing to form a detonatable bridge circuit between said ends as well as an element for detecting the heating of said bridge circuit by incident radiation.

11. An electrically operated squib as set forth in claim 10 in which said pins are respectively of the same metal as that part of said thermocouple to which said pins are connected.

12. An electrically operated squib as set forth in claim 10 in which said bridge circuit is part of an external electrical circuit in which it acts as a switching element to disconnect said external circuit upon detonation.

13. An electrically operated squib as set forth in claim 10 in which an explosive mixture is associated with said thermocouple so that an explosion is initiated by heating said bridge circuit.

14. An electrically operable squib comprising a thermocouple made from two dissimilar electrically conductive metals of small cross section joined together to form a thermocouple junction, said dissimilar metals each being of cross section such that they have substantially the same conductivity.

References Cited by the Examiner
UNITED STATES PATENTS
3,211,096   10/1965   Forney et al. _____ 102—28

BENJAMIN A. BORCHELT, *Primary Examiner.*

V. R. PENDEGRASS, *Assistant Examiner.*